United States Patent
Feng et al.

(10) Patent No.: US 11,908,117 B2
(45) Date of Patent: *Feb. 20, 2024

(54) IMAGE PROCESSING METHOD AND APPARATUS FOR OBJECT DETECTION

(71) Applicant: SAMSUNG ELECTRONICS CO., LTD., Suwon-si (KR)

(72) Inventors: Hao Feng, Beijing (CN); Jae-Joon Han, Seoul (KR); Changkyu Choi, Seongnam-si (KR); Chao Zhang, Beijing (CN); Jingtao Xu, Beijing (CN); Yanhu Shan, Beijing (CN); Yaozu An, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 362 days.

This patent is subject to a terminal disclaimer.

(21) Appl. No.: 17/227,704

(22) Filed: Apr. 12, 2021

(65) Prior Publication Data

US 2021/0232846 A1   Jul. 29, 2021

Related U.S. Application Data

(63) Continuation of application No. 15/926,161, filed on Mar. 20, 2018, now Pat. No. 10,977,509.

(30) Foreign Application Priority Data

Mar. 27, 2017 (CN) .......................... 201710188186.1
Jan. 3, 2018   (KR) .......................... 10-2018-0000698

(51) Int. Cl.
*G06T 7/00* (2017.01)
*G06T 7/73* (2017.01)
(Continued)

(52) U.S. Cl.
CPC ........ *G06T 7/0002* (2013.01); *G06F 18/2148* (2023.01); *G06T 3/4007* (2013.01);
(Continued)

(58) Field of Classification Search
CPC .. G06V 10/993; G06V 40/169; G06V 40/161; G06V 40/172; G06V 40/171;
(Continued)

(56) References Cited

U.S. PATENT DOCUMENTS

| 7,359,529 | B2 * | 4/2008 | Lee ....................... G06F 18/213 |
| | | | 382/118 |
| 8,254,647 | B1 | 8/2012 | Nechyba et al. |

(Continued)

FOREIGN PATENT DOCUMENTS

| CN | 101661557 A | 3/2010 |
| CN | 102867179 A | 1/2013 |

(Continued)

OTHER PUBLICATIONS

Fan, "Digital Image Processing and Analysis (The Third Edition)" Beihang University Press, 2015, (2 pages in English, 6 pages in Chinese).

(Continued)

*Primary Examiner* — Ian L Lemieux
(74) *Attorney, Agent, or Firm* — NSIP Law

(57) ABSTRACT

An image processing method implemented by a processor includes receiving an image, acquiring a target image that includes an object from the image, calculating an evaluation score by evaluating a quality of the target image, and detecting the object from the target image based on the evaluation score.

20 Claims, 3 Drawing Sheets

(51) Int. Cl.
  *G06V 10/20* (2022.01)
  *G06V 10/98* (2022.01)
  *G06V 40/16* (2022.01)
  *G06F 18/214* (2023.01)
  *G06V 10/774* (2022.01)
  *G06V 10/46* (2022.01)

(52) U.S. Cl.
  CPC .............. *G06T 7/73* (2017.01); *G06V 10/255* (2022.01); *G06V 10/7747* (2022.01); *G06V 10/993* (2022.01); *G06V 40/171* (2022.01); G06T 2207/30168 (2013.01); *G06V 10/467* (2022.01)

(58) Field of Classification Search
  CPC .... G06V 10/751; G06V 40/16; G06V 40/165; G06V 10/255; G06V 10/467; G06V 10/7747; G06V 20/647; G06V 40/162; G06V 40/168; G06V 10/10; G06V 10/32; G06V 10/40; G06V 10/764; G06V 10/7715; G06V 10/82; G06V 10/95; G06V 20/30; G06V 20/41; G06V 20/653; G06V 30/142; G06V 40/164; G06V 40/166; G06V 40/174; G06V 40/67; G06T 7/0002; G06T 3/4007; G06T 7/73; G06T 2207/30168; G06T 2200/24; G06T 2207/10016; G06T 2207/20092; G06T 2207/30004; G06T 2207/30196; G06T 2207/30201; G06T 2207/30242; G06T 5/00; G06T 7/20; G06T 7/62; G06T 7/74; G06T 15/04; G06T 19/20; G06T 2219/2021; G06T 7/001; G06T 7/11; G06T 7/12; G06T 7/13; G06T 7/337
  See application file for complete search history.

(56) References Cited

U.S. PATENT DOCUMENTS

| | | | |
|---|---|---|---|
| 8,379,939 | B1 | 2/2013 | Bourdev et al. |
| 8,600,121 | B2 | 12/2013 | Gamliel et al. |
| 9,292,754 | B2 | 3/2016 | Shin et al. |
| 9,367,730 | B2 | 6/2016 | Irmatov et al. |
| 9,471,831 | B2 | 10/2016 | Kim et al. |
| 10,963,675 | B2 * | 3/2021 | Boic .................. G06V 40/172 |
| 2006/0039587 | A1 * | 2/2006 | Yoon .................. G06V 40/162 382/115 |
| 2007/0080967 | A1 * | 4/2007 | Miller ................. G06V 20/653 345/473 |
| 2010/0086182 | A1 | 4/2010 | Luo et al. |
| 2014/0044348 | A1 | 2/2014 | Chen et al. |
| 2016/0028921 | A1 * | 1/2016 | Thrasher ............ H04N 1/40012 358/519 |
| 2016/0275339 | A1 * | 9/2016 | De la Torre ......... G06V 40/171 |
| 2017/0185843 | A1 | 6/2017 | Goto et al. |
| 2018/0032815 | A1 * | 2/2018 | Lee ..................... G06V 40/193 |

FOREIGN PATENT DOCUMENTS

| | | |
|---|---|---|
| CN | 103810466 A | 5/2014 |
| CN | 104978550 A | 10/2015 |
| CN | 105139003 A | 12/2015 |
| JP | 2014-505952 A | 3/2014 |
| KR | 10-2015-0135745 A | 12/2015 |
| KR | 10-2016-0022596 A | 3/2016 |
| KR | 10-2020-0046137 A | 5/2020 |
| KR | 10-2020-0075141 A | 6/2020 |

OTHER PUBLICATIONS

"Automation Control and System Engineering" Chinese Great Encyclopedia, 1998, (3 pages in English, 5 pages in Chinese).
Li, et al., "Analysis of Digital Image Pattern Recognition Method" Harbin Engineering University Press, 2000, (1 page in English, 7 pages in Chinese).
Korean Office Action dated Feb. 13, 2023, in counterpart Korean Patent Application No. 10-2018-0000698 (2 pages in English, 4 pages in Korean).
Chinese Office Action dated Mar. 1, 2023, in counterpart Chinese Patent Application No. 201710188186.1 (7 pages in English, 38 pages in Chinese).
Dashuju Fenxi yu Yingyong., Big Data Analysis and Application., ISBN 9787516509562, 2015 (1 page in English, 7 pages in Chinese).
On the Face Recognition Algorithm Based on Subspace and Manifold Learning., ISBN 9787209073066, 2013 (1 page in English, 12 pages in Chinese).
Proceedings of 14 the Youth Academic Conference of China Institute of Electronics., ISBN 9787118059731, 2009 (4 pages in Chinese, English abstract on p. 3).
Chinese Office Action dated Apr. 6, 2022, in counterpart Chinese Patent Application No. 201710188186.1 (15 pages in English, 32 pages in Chinese).
Chinese Office Action dated Nov. 3, 2022, in counterpart Chinese Patent Application No. 201710188186.1 (9 pages in English, 6 pages in Chinese).
Kotropoulos, Constantine et al., "Morphological Elastic Graph Matching Applied to frontal face authentication under well-controlled and real conditions," Pattern Recognition, 33, 12, 2000 (pp. 1935-1947).
Wagner, Daniel et al., "Multiple Target Detection and Tracking with Guaranteed Framerates on Mobile Phones," *2009 8th IEEE International Symposium on Mixed and Augmented Reality. IEEE*, 2009 (pp. 57-64).
Korean Office Action dated Aug. 30, 2023, in counterpart Korean Patent Application No. 10-2018-0000698 (1 page in English, 3 pages in Korean).

* cited by examiner

| $g_0$ | $g_1$ | $g_2$ |
|---|---|---|
| $g_3$ | $g_c$ | $g_4$ |
| $g_5$ | $g_6$ | $g_7$ |

IMAGE PROCESSING METHOD AND APPARATUS FOR OBJECT DETECTION

CROSS-REFERENCE TO RELATED APPLICATIONS

This application is a continuation of U.S. patent application Ser. No. 15/926,161 filed on Mar. 20, 2018 which claims the benefit under 35 USC § 119(a) of Chinese Patent Application No. 201710188186.1 filed on Mar. 27, 2017 in the State Intellectual Property Office of the People's Republic of China, and Korean Patent Application No. 10-2018-0000698 filed on Jan. 3, 2018 in the Korean Intellectual Property Office, the entire disclosures of which are incorporated herein by reference for all purposes.

BACKGROUND

1. Field

The following description relates to an image processing method and apparatus for recognizing an object.

2. Description of Related Art

A typical image processing approach is widely used in a variety of fields. In general, such an image processing approach is used to detect a target desired by a user, and perform image processing and detection using a computer.

Here, a provided image is analyzed and a target desired to be detected is extracted from the provided image. The image processing approach is widely used in various fields, for example, a video recognition, an interface image search, and a monitoring system.

The typical image processing approach recognizes a target using a non-contact approach. Thus, a degradation in the quality of an image may occur, such as blurriness, low illumination, and presence of backlight from the photography environment or photography device.

The degradation in the quality of the image may be recognized using an existing image quality evaluation approach. However, the degradation in the quality of the image, such as due to damage to the image content caused by an algorithm failure and a steep obtuse angles of a face when recognizing the face, may not be recognized using the existing image quality evaluation approach.

In the case of recognizing a quality-degraded image, typical image processing approach also has recognition issues and uses a relatively large amount of time to recognize the image. In addition, the typical image processing approach may cause an erroneous matching result due to the relatively low recognition accuracy of the image processing approach.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor implemented image processing method includes receiving an image; acquiring a target image that includes an object from the image; calculating an evaluation score by evaluating a quality of the target image; and detecting the object from the target image based on the evaluation score.

The acquiring of the target image may include acquiring a target area including the object from the image; extracting information associated with a feature of the object from the target area; and normalizing the target area based on the information and acquiring the target image.

The acquiring of the target area may include detecting the object included in the image; and acquiring the target area by detecting the feature of the object from the object.

The information may include any one or any combination of two or more of a contour of the feature of the object, a relative location of the feature of the object on the target area, and an area of the feature of the object on the target area.

The normalizing of the target area and the acquiring of the target image may include performing an approximation of the target area by enlarging or reducing the target area; performing a scale normalization on the approximated target area based on the information; and acquiring the target image by performing an illumination normalization on the scaled normalized target area.

The performing of the scale normalization may include correcting a size and an angle of the feature of the object with respect to the approximated target area.

The detecting of the object from the target image may include comparing the evaluation score and a detection reference score; and determining whether to perform a detection of the object based on a result of the comparing.

The determining whether to perform the detection may include suspending the detection of the object in response to the evaluation score being less than the detection reference score based on the comparison result; and performing the detection of the object in response to the evaluation score being greater than or equal to the detection reference score based on the comparison result.

The determining whether to perform the detection may further include determining whether to perform a detection of an object included in a subsequent frame based on an evaluation score of the object included in the subsequent frame, in response to the evaluation score being less than the detection reference score based on the comparison result.

The detecting may include detecting the object using an AdaBoost algorithm.

In another general aspect, an image processing apparatus includes a receiver configured to receive an image; and a controller configured to detect an object included in the image by evaluating a quality of the image. The controller includes a target image acquirer configured to acquire a target image that includes the object from the image; a quality evaluator configured to calculate an evaluation score by evaluating a quality of the target image; and an object detector configured to detect the object from the target image based on the evaluation score.

The target image acquirer may include a target area acquirer configured to acquire a target area including the object from the image; an information extractor configured to extract information associated with a feature of the object from the target area; and a normalizer configured to normalize the target area based on the information and to acquire the target image.

The target area acquirer may be configured to detect the object included in the image, and to acquire the target area by detecting the feature of the object from the object.

The information may include any one or any combination of two or more of a contour of the feature of the object, a relative location of the feature of the object on the target area, and an area of the feature of the object on the target area.

The normalizer may be configured to perform an approximation by enlarging or reducing the target area, perform a scale normalization on the approximated target area based on the information, and acquire the target image by performing an illumination normalization on the scaled normalized target area.

The normalizer may be configured to correct a size and an angle of the feature of the object with respect to the approximated target area.

The object detector may be configured to compare the evaluation score and a detection reference score, and to determine whether to perform a detection of the object based on a result of the comparing.

The object detector may be configured to suspend the detection of the object in response to the evaluation score being less than the detection reference score based on the comparison result, and to perform the detection of the object in response to the evaluation score being greater than or equal to the detection reference score based on the comparison result.

The object detector may be configured to determine whether to perform a detection of an object included in a subsequent frame based on an evaluation score of the object included in the subsequent frame, in response to the evaluation score being less than the detection reference score based on the comparison result.

The object detector may be configured to detect the object using an AdaBoost algorithm.

In another general aspect, an image processing method implemented by a processor, includes: receiving an image in a plurality of frames; acquiring a target image that includes an object from the image in a first frame of the plurality of frames; calculating an evaluation score by evaluating a quality of the target image in the first frame; and suspending a detection of the object from the target image in the first frame in response to the evaluation score being less than a detection reference score and performing the detection of the object in response to the evaluation score being greater than or equal to the detection reference score.

Subsequent frames of the plurality of frames may be evaluated based on the evaluation score of the object included in the first frame.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
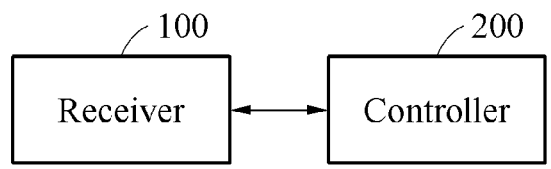
FIG. 1 illustrates an example of an image processing apparatus.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 illustrates an example of an image processing apparatus.

Referring to FIG. 1, an image processing apparatus 10 may perform image processing capable of effectively evaluating the quality of an image and detecting an object. The image processing apparatus 10 may enhance an accuracy of object recognition and detect the object at a high rate using a method that does not perform a detection processing of an object in a low quality image prior to detecting the object. Herein, the expressions "detection of an object" and "object detection" will be interchangeably used throughout.

The image processing apparatus 10 may enhance the accuracy and speed of object detection by reducing the amount of time used to perform the detection in a low quality image. The objection detection, that is, the detection of the object includes the recognition of the object.

The image processing apparatus 10 receives the image, acquires a target image, performs a quality evaluation on the acquired target image, and calculates an evaluation score. The image processing apparatus 10 compares the evaluation score and a detection reference score and determines whether to perform a detection of the object, that is, an object detection based on the result of the comparison. In an example, the detection reference score is a predetermined integer.

If the evaluation score is less than the detection reference score, the image processing apparatus 10 may not perform the detection of an object on the received image. Accordingly, the image processing apparatus 10 enhances the image processing rate, significantly reduces the image processing time, and enhances the object detection rate.

The image processing apparatus 10 also enhances the accuracy of object detection and an object detection speed, e.g., the speed at which an objected is detected.

The image processing apparatus 10 prevents a decrease in the detection rate in a poor image by applying a quality evaluation operation during the object detection process. For example, when recognizing a face of a person through the image processing apparatus 10, the quality of an image of the person's face may be degraded due to deformation of the captured face, the face of a non-person, or a relatively steep obtuse angle of the face. In this case, the face detection process is not performed.

The image processing apparatus 10 performs preprocessing of the image to perform the object detection. The image processing apparatus 10 enhances the accuracy of the object detection by reducing the influence of the photography device, a photography environment, and photography content associated with the image over the object detection, which allows the image processing apparatus 10 to effectively perform a facial recognition used for a man-machine interface, surveillance, inquiry, and security, etc.

Referring to FIG. 1, the image processing apparatus 10 includes a receiver 100 and a controller 200.

The receiver 100 receives an image. The image received by the receiver 100 includes a static photo and an image including an object. The image may include a plurality of frames.

The receiver 100 includes a plurality of photography devices or a plurality of terminals. The terminals may include, for example, a computer, a server, and the like. The receiver 100 may receive a plurality of images from the plurality of photography devices, and may receive a plurality of images from the plurality of terminals.

The receiver 100 outputs the received image to the controller 200.

The controller 200 detects an object included in the received image by evaluating the quality of the received image. The controller 200 may detect the object included in the image using a machine learning algorithm.

The object may include any of the targets included in the image to be detected through image processing. The object may indicate a specific area included in the image. For example, the object may include a face of a person.

Figure 2:
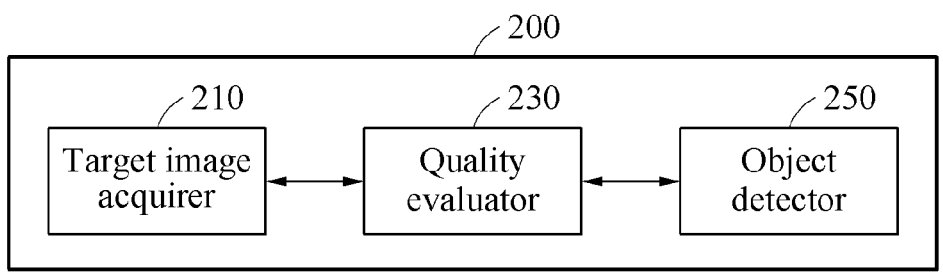
FIG. 2 illustrates an example of a controller of FIG. 1.

FIG. 2 illustrates an example of the controller 200 of FIG. 1.

Referring to FIG. 2, the controller 200 includes a target image acquirer 210, a quality evaluator 230, and an object detector 250.

The target image acquirer 210 acquires a target image including an object from a received image. In one example, the target image acquirer 210 acquires the target image using a target model. The target model may include, for example, a first target model and a second target model. The target model may include an AdaBoost adaptive algorithm classifier.

The target image acquirer 210 acquires a target area based on a target model or a structural model. The target model or the structural model may include a set of morphological models including different morphologies of objects. The target model or the structural model may include the same type of objects captured at different angles.

In one example, if the target model or the structural model is a face model, the face model includes different face shapes and face shapes captured at different angles.

The target model may analyze and establish a mathematical model using principles of statistics and by combining the same type of target attributes. The mathematical model may include a mathematical model that is combined with a biostatical principle.

The target image acquirer 210 may enhance the accuracy of object detection during a post-processing process by performing preprocessing on the target image. In one example, if the object is a face, the target image acquirer 210 performs preprocessing on the target image that includes the face.

The target image acquirer 210 acquires the target image using a training classifier of an AdaBoost algorithm. The target image acquirer 210 outputs the acquired target image to the quality evaluator 230.

The quality evaluator 230 calculates an evaluation score by evaluating the quality of the target image. The quality evaluator 230 assigns a relatively high evaluation score based on an increase in the quality of the target image and assigns a relatively low evaluation score based on a decrease in the quality of the target image.

If the target image includes a portion that matches an object to be detected, the quality evaluator 230 calculates the evaluation score of the target image based on a matching level. For example, in the case of a face recognition, the quality evaluator 230 assigns a relatively high evaluation score if the target image highly matches a facial characteristic and assigns a relatively low evaluation score if the target image does not highly match the facial characteristic.

The quality evaluator 230 evaluates the quality of the target image using the same machine learning algorithm as one used by the object detector 250. Since the quality evaluator 230 and the object detector 250 use the same algorithm, production cost of the image processing apparatus 10 may be reduced. For example, the quality evaluator 230 evaluates the quality of the target image using an AdaBoost algorithm.

The quality evaluator 230 evaluates the quality of the target image by constructing a target model from the target image. The quality evaluator 230 may evaluate the quality of the target image using a second target model. The second target model may be constructed using the AdaBoost algorithm.

The first target model and the second target model may be identical and include an AdaBoost adaptive algorithm classifier.

The target model may include different shapes of objects of the same type. For example, if the object is of a face type, the target model will be a face model. The face model may include the same faces having different shapes and/or captured at different angles.

The quality evaluator 230 evaluates the quality of the target image by matching the target model and the target image. If the target model and the target image do not successfully match, the quality evaluator 230 may reduce the evaluation score of the target image.

A target image having a low evaluation score may lead to a failure of the object detection. In one example, if the object is a face and a damaged facial image is used, the object detector 250 will not accurately detect the face. The damaged facial image may include any one or any combination of two or more of a diagonal facial image, a transformed facial image, a non-facial image, a twisted image, a strange posture image, a low illumination image, a blurred image, and the like.

The quality evaluator 230 calculates the evaluation score using a mathematical model that is constructed based on statistics. For example, the mathematical model may be constructed using the AdaBoost algorithm.

The object detector 250 detects the object from the target image based on the evaluation score. The object detector 250 compares the evaluation score and a detection reference score, and determines whether to perform the object detection based on a comparison result.

If the evaluation score is less than the detection reference score based on the comparison result, the object detector 250 may suspend the object detection. If the evaluation score is greater than or equal to the detection reference score based on the comparison result, the object detector 250 may perform the object detection.

If the evaluation score of the target image is greater than or equal to the detection reference score, the object detector 250 may compare the target image and pre-stored image data including the same type of an object as a type of the target image. The object detector 250 may identify the object to determine an object detection result.

For example, if the object is a face and the evaluation score of the target image is greater than or equal to the detection reference score, the object detector 250 compares the target image and big data that stores a facial image and acquire a detection result of the target image.

If an evaluation score of a facial image of a person captured from a security area is greater than or equal to the detection reference score, the object detector 250 compares the facial image and pre-stored facial image data, may acquire object information of the captured person, and may determine whether to allow an access of the captured person.

If the evaluation score is less than the detection reference score, the object detector 250 may suspend the object detection with respect to the target image and may reduce the image processing time. The object detector 250 may suspend the object detection with respect to a current frame and may determine whether to perform a detection of an object included in a subsequent frame.

If the evaluation score is less than the detection reference score based on the comparison result, the object detector 250 may determine whether to perform a detection of an object included in the subsequent frame based on an evaluation score of the object included in the subsequent frame.

A subsequent frame of an image may be acquired by consecutively capturing a plurality of images that includes the same object over time. The subsequent frame may indicate a subsequent frame among frames that are regularly classified from different frames captured of the same object a number of times. Also, the subsequent frame may indicate a frame that includes the same type of the object.

For example, if the object is a face of a person and an evaluation score of a target image including the face is less than a detection reference score, the object detector 250 suspends the detection of the face with respect to a current frame and performs a detection of the face included in a subsequent frame.

The subsequent frame may indicate a subsequent frame based on a frame order of frames consecutively captured by the same photographer, different frames that are regularly classified by the same photographer, or a frame captured by a different photographer.

The object detector 250 detects the object using a machine learning algorithm. For example, the object detector 250 detects the object using the AdaBoost algorithm.

The object detector 250 may enhance an object detection speed by employing an object training model. Accordingly, the object detector 250 may enhance the object detection speed and may also reflect a quality of an object image. For example, the object detector 250 may perform a face detection using an AdaBoost training model.

Figure 3:
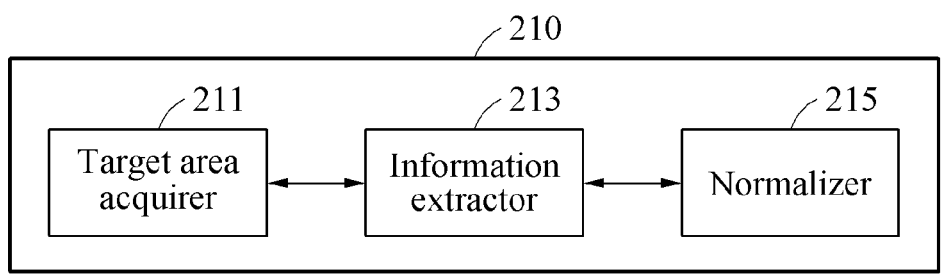
FIG. 3 illustrates an example of a target image acquirer of FIG. 2.

FIG. 3 illustrates an example of the target image acquirer 210 of FIG. 2.

Referring to FIG. 3, the target image acquirer 210 includes a target area acquirer 211, an information extractor 213, and a normalizer 215.

The target area acquirer 211 acquires a target area including an object from an image. The target area acquirer 211 acquires the object included in the image and acquires the target area by detecting a feature of the object from the object.

The target area acquirer 211 detects the object included in the image using a target model, and acquires the target area by detecting a feature of the object from the object. For example, if the object is a face of a person, the target area acquirer 211 detects the face included in the image, a feature of the face, and acquires a face area.

The target area acquirer 211 acquires the target area using a first target model. The target area acquirer 211 may separate the target area using an AdaBoost algorithm.

The information extractor 213 extracts information associated with the feature of the object from the target area. Information associated with the feature of the object may include any one or any combination of any two or more of the feature of the object, a contour of the feature of the object, a relative location of the feature of the object on the target area, and an area of the feature of the object on the target area.

The feature of the object may indicate a portion of the object that differentiates the object from another target. In one example, if the object is a face of a person, the feature of the object is an eye, a nose, lips, etc., of the person.

If the object is a face of a person, the target area may indicate a face area. Information associated with the feature of the object may include an eye, a nose, a contour, lips, and an eyebrow, and shapes thereof.

Information associated with the feature of the object may include information associated with a plurality of features.

Information associated with the feature of the object may include an area of each of features of the face on a face area and relative locations between the features.

The information extractor 213 acquires information associated with the feature of the object using a supervised descent method (SDM). In general, the SDM is used to minimize a nonlinear least squares function. The information extractor 213 optimizes an objective function of detecting the feature of the object, that is, optimizes a solution of information associated with the feature of the object.

The information extractor 213 extracts information associated with the feature of the object using the AdaBoost algorithm. For example, if the object is a face, the information extractor 213 extracts information associated with a feature of the face using the AdaBoost algorithm.

The normalizer 215 acquires the target image by normalizing the target area based on information associated with the feature of the object. The normalizer 215 may perform an approximation by enlarging or reducing the target area.

The normalizer 215 may acquire an initially processed target image within a desired normalization range. Since an object recognition range is set for general object recognition, the object may be recognized when a size of the image is within the set object recognition range.

For example, if the received image is relatively large, the normalizer 215 calculates a feature of the object and the target area based on a reduction equation/enlargement equation. The normalizer 215 may acquire the target image within the normalization range by reducing or enlarging the feature of the object based on the feature of the object, a shape of the object, a size of the object, and an area of the feature of the object on the target area. Through this, the normalizer 215 may easily perform a quality evaluation and an objection detection.

If source mapping coordinates of the target image are not expressed using an integer, a corresponding pixel location may not be found. Accordingly, the normalizer 215 may perform an approximation on the target area so that the source mapping coordinates of the target image are expressed using an integer, as an example.

The approximation may include a nearest neighbor interpolation, a bilinear interpolation, a high-order interpolation, a Lagrange interpolation, and a Newton interpolation.

In one example, if the object is a face of a person, the normalizer 215 performs an approximation by enlarging or reducing an image of a face area based on information associated with a feature of the face extracted from the face area. The normalizer 215 may enlarge or reduce the face area and the feature of the face using a reduction equation/enlargement equation.

The normalizer 215 may acquire the target image within the normalization range by enlarging or reducing the feature of the face based on any one or any combination of any two or more of an eye, a nose, a contour, lips, an eyebrow corresponding to the feature of the face, shapes and sizes thereof, and an area of the feature of the face on the target area.

The normalizer 215 performs a scale-normalization on the approximated target area based on information associated with the feature of the object. The normalizer 215 acquires the target image by performing an illumination normalization on the scale-normalized target area.

The normalizer 215 corrects a size and an angle of the feature of the object with respect to the approximated target area. In one example, if the object is a face, the normalizer 215 corrects a size and a rotation angle of the face area that includes areas of an eye, a nose, a contour, lips, an eyebrow, and relative locations between features of the face.

An angle correction may be performed by rotating an image based on an origin or a predetermined point. In response to rotating the approximated target area, the number of pixels included in the image may increase. In this case, the normalizer 215 may clip the image if the size is out of the desired range to be within the desired range.

For example, if an angle of a face area is not within the normalization range, the normalizer 215 rotates the face area. Here, the normalizer 215 rotates the face area based on an origin or a predetermined point.

The normalizer 215 may acquire a rotation angle of the feature of the face, a rotation angle of the face, and an illumination of the face area. The correction method may include any one or any combination of any two or more of a gamma transform, a Gaussian differential filtering, and a contrast equalization of an image, to calculate the target area.

To easily recognize the target image, the normalizer 215 may perform an illumination normalization of enhancing a low illumination. The gamma transform may be a nonlinear transform within a gray scale. The normalizer 215 may effectively enhance intensity of the illumination of an area having a low brightness corresponding to a gray scale range and an area having a high strength phase corresponding to a gray scale compression range, and may adjust the overall brightness of the image by changing different gamma parameters.

The normalizer 215 may perform an illumination normalization based on a reflection coefficient and intensity of incident light relative to an object. The reflection coefficient may include structure information of a target. The normalizer 215 may acquire target structure information irrelevant to an illumination by performing an algebra conversion on the image.

Gaussian differential (difference of Gaussians) filtering achieves a band-pass filtering effect. The Gaussian differential filtering is similar to a quadratic differential of a Gaussian function, and has a function of detecting and positioning an edge of an image by performing a Gaussian smoothing based on a difference between two Gaussian function responses of a central area and a peripheral area, and by processing the quadratic differential on a Gaussian smoothing result.

The Gaussian differential filtering removes or reduces distortion by noise and a degradation in a quality of the image. That is, the Gaussian differential filtering enhances an object detection rate by enhancing the quality of the image. An equalization is mainly performed to readjust a gray level of the entire image so that the brightness of the entire image may reach a standard.

A facial image may be easily affected by the color of a light source and a color deviation of an image collecting device. The facial image may have bias depending on warmness, coldness, blue, yellow, etc., in association with an image color. A color distortion may occur during a process of storing and transmitting the facial image in a computer. The occurrence of the color distortion may affect a gray value and a contrast of the image.

Such distortion occurring in the facial image may affect a detection of a face. Thus, the normalizer 215 may normalize the illumination of the image by performing an illumination normalization. The normalizer 215 may decrease the influence from the color of the light source and the color deviation of the image collecting device by performing the Gaussian differential filtering and the contrast equalization, and may acquire a visual element required to detect the object.

The normalizer 215 may correct information associated with the feature of the object. Correction may include correction of a size and an angle of the feature of the object. The normalizer 215 may correct the size and the angle of the feature of the object so that the target image may be a standard image within the normalization range. In one example, the normalizer 215 adjusts a facial image to be a frontal image of the face.

The normalizer 215 may preset a pixel value of the target image. The pixel value is a preset value or may be within a preset range. In one example, the normalizer 215 adjusts a pixel value of the facial image to be a preset pixel value or within a preset pixel value range.

The normalizer 215 outputs the target image to the quality evaluator 230.

Figure 4:
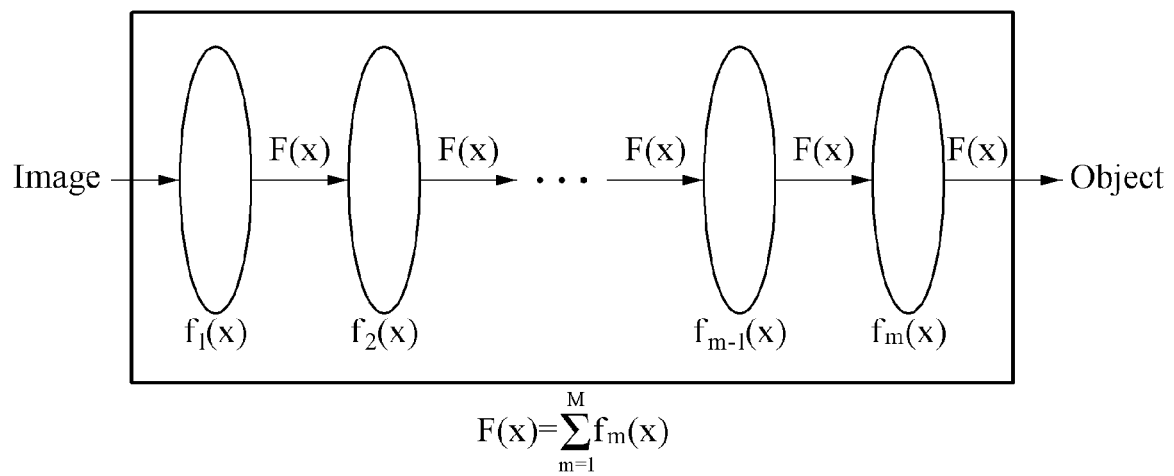
FIG. 4 illustrates an example operation of the image processing apparatus of FIG. 1.
Figures 5, 6:
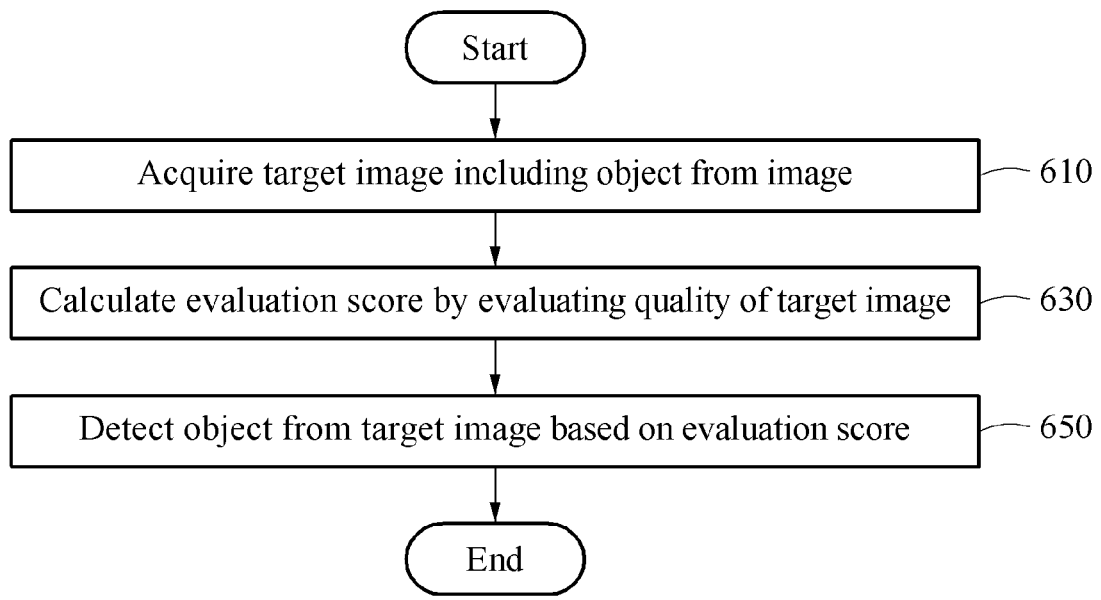
FIG. 5 illustrates an example of a grid of multi-scale block local binary patterns (MB-LBPs).
FIG. 6 is a flowchart illustrating an example of an image processing method.

FIG. 4 illustrates an example of an operation of the image processing apparatus 10 of FIG. 1, and FIG. 5 illustrates an example of a grid of multi-scale block lock binary patterns (MB-LBPs).

Referring to FIGS. 4 and 5, the image processing apparatus 10 detects an object by receiving and processing an image. The image processing apparatus 10 includes a plurality of classifiers.

The image processing apparatus 10 may perform image processing using an AdaBoost algorithm. The AdaBoost algorithm may be an iterative algorithm of generating a single strong classifier by combining a plurality of weak classifiers. The AdaBoost algorithm selects a single weak classifier from among weak classifiers, and minimizes a classification error function of the selected weak classifier.

Once a specific sample point is accurately classified, a set to be used for a subsequent training may be constructed and a weight may decrease. Unless the specific sample point is accurately classified, a weight may increase.

Sets of updated samples may be used to train a subsequent weak classifier and a total training process may be iteratively performed.

An error function is represented by Equation 1.

$$J_{wse} = \sum_{i=1}^{N} w_i(y_i - f_m(x_i))^2 \quad \text{[Equation 1]}$$

In Equation 1, $J_{wse}$ denotes an evaluation score, N denotes a number of samples, $w_i$ denotes a weight of a sample i, $y_i$ denotes a label of the sample i, $f_m$ denotes a weak classifier, and $x_i$ denotes a feature of the sample i.

A determined strong classifier is represented by Equation 2.

$$F(x) = \sum_{m=1}^{M} f_m(x) \quad \text{[Equation 2]}$$

If a detection rate and an accuracy of a test performed by the strong classifier on a sample set reach a given threshold or if all of the weak classifiers are used, training may be suspended. The strong classifier may indicate a score used to distinguish a background and an object from each other. The strong classifier may indicate a similarity score between the object and a target model. In one example, the strong classifier indicates a score used to distinguish a background and a face from each other, and indicates a similarity score between a face of a person and an image.

If the object is a face of a person, the target image acquirer 210 may acquire a facial image and the quality evaluator 230 may evaluate the quality of the facial image.

The quality evaluator 230 may use a score that is output from AdaBoost by directly using a training model for face detection, as a similarity score between the image and a face model.

The object detector 250 may not perform a face detection if an evaluation score of a facial image is less than a detection reference score, and may perform the face detection if the evaluation score is greater than or equal to detection reference score. In one example, the detection reference score is 450. The detection reference score may be changed based on a test.

In FIG. 5, information associated with an image based on local 2D patterns, a target image, and a feature of an object may be extracted using an AdaBoost algorithm, for example, MB-LBP. A feature value of the MB-LBP may be input to a weak classifier. The MB-LBP includes 3×3 grid areas. Each grid area may be provided at a desired location of the image.

The MB-LBP calculates an average pixel value of each grid area in the grid and compares an average pixel value of a grid area corresponding to a peripheral area of the grid and an average pixel value of a grid area corresponding to a central area of the grid. The MB-LBP may compare pixel values using binary coding.

The MB-LBP is a number between 0 and 255, and may be represented by Equation 3.

$$MB - LBP = \sum_{i=0}^{7} s(g_i - g_c)2^i \quad \text{[Equation 3]}$$

In Equation 3, $g_i$ denotes a pixel value of each grid area. An AdaBoost classifier may use a multiple branch tree as a weak classifier. The multiple branch tree is defined as Equation 4.

$$f_m(x) = \begin{cases} a_0, & x^k = 0, \\ \ldots \\ a_j, & x^k = j, \\ \ldots \\ a_{255}, & x^k = 255, \end{cases} \quad \text{[Equation 4]}$$

In Equation 4, $x^k$ denotes a feature value of the MB-LBP and $a_j$ (j=0, . . . , 255) denotes a classifier parameter. The classifier parameter is calculated according to Equation 5.

$$a_j = \frac{\sum_i w_i y_i \delta(x_i^k = j)}{\sum_i w_i \delta(x_i^k = j)} \quad \text{[Equation 5]}$$

In Equation 5, $w_i$ denotes a weight of the sample i, $x_i$ denotes a feature of the sample i, and $y_i$ denotes a label of the sample i.

FIG. 6 is a flowchart illustrating an example of an operation of an image processing method.

Referring to FIG. 6, in operation 610, the target image acquirer 210 acquires a target image including an object from an image. In one example, the target image acquirer 210 acquires the target image using a first target model. A target model includes an AdaBoost adaptive algorithm classifier.

In operation 630, the quality evaluator 230 calculates an evaluation score by evaluating a quality of the target image. The quality evaluator 230 assigns a relatively high evaluation score according to an increase in the quality of the target image and assigns a relatively low evaluation score according to a decrease in the quality of the target image. The quality evaluator 230 may evaluate the quality of the target image using the same machine learning algorithm as one used by the object detector 250.

The quality evaluator 230 evaluates the quality of the target image by constructing a target model from the target image. The quality evaluator 230 evaluates the quality of the target image using a second target model. A target model may be constructed using an AdaBoost algorithm.

In operation 650, the object detector 250 detects the object from the target image based on the evaluation score. The object detector 250 compares the evaluation score and a detection reference score, and determines whether to perform the object detection.

If the evaluation score is less than the detection reference score based on the comparison result, the object detector 250 may suspend the object detection. If the evaluation score is greater than or equal to the detection reference score based on the comparison result, the object detector 250 may perform the object detection.

The use of the term 'may' herein with respect to an example or embodiment, e.g., as to what an example or embodiment may include or implement, means that at least one example or embodiment exists where such a feature is included or implemented while all examples and embodiments are not limited thereto.

The receiver 100, controller 200, target image acquirer 210, quality evaluator 230, object detector 250, target area acquirer 211, information extractor 213, and normalizer 215 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIG. 6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented image processing method, comprising:
   receiving an image;
   acquiring a target image that includes an object from the image by normalizing a target area including the object based on an information associated with a feature of the object;
   calculating an evaluation score by evaluating a quality of the target image; and
   detecting the object from the target image based on the evaluation score,
   wherein the acquiring of the target image comprises:
      performing an approximation of the target area by enlarging or reducing the target area;
      performing a scale normalization on the approximated target area based on the information; and
      acquiring the target image by performing an illumination normalization on the scaled normalized target area.

2. The method of claim 1, wherein the acquiring of the target image comprises:
   acquiring the target area including the object from the image; and
   extracting the information associated with the feature of the object from the target area.

3. The method of claim 2, wherein the acquiring of the target area comprises:
   detecting the object included in the image; and
   acquiring the target area by detecting the feature of the object from the object.

4. The method of claim 2, wherein the information comprises any one or any combination of two or more of a contour of the feature of the object, a relative location of the feature of the object on the target area, and an area of the feature of the object on the target area.

5. The method of claim 1, wherein the performing of the scale normalization comprises:
   correcting a size and an angle of the feature of the object with respect to the approximated target area.

6. The method of claim 1, wherein the detecting of the object from the target image comprises:
   comparing the evaluation score and a detection reference score; and
   determining whether to perform a detection of the object based on a result of the comparing.

7. The method of claim 6, wherein the determining whether to perform the detection comprises:
   suspending the detection of the object in response to the evaluation score being less than the detection reference score based on the comparison result; and
   performing the detection of the object in response to the evaluation score being greater than or equal to the detection reference score based on the comparison result.

8. The method of claim 7, wherein the determining whether to perform the detection further comprises:
   determining whether to perform a detection of an object included in a subsequent frame based on an evaluation score of the object included in the subsequent frame, in response to the evaluation score being less than the detection reference score based on the comparison result.

9. The method of claim 1, wherein the detecting comprises detecting the object using an AdaBoost algorithm.

10. An image processing apparatus comprising:
    a receiver configured to receive an image; and
    a controller configured to detect an object included in the image by evaluating a quality of the image, the controller comprising:
    a target image acquirer configured to acquire a target image that includes the object from the image by normalizing a target area including the object based on an information associated with a feature of the object;
    a quality evaluator configured to calculate an evaluation score by evaluating a quality of the target image; and
    an object detector configured to detect the object from the target image based on the evaluation score,
    wherein the target image acquirer comprises a normalizer configured to:
       perform an approximation by enlarging or reducing the target area,
       perform a scale normalization on the approximated target area based on the information, and
       acquire the target image by performing an illumination normalization on the scaled normalized target area.

11. The image processing apparatus of claim 10, wherein the target image acquirer comprises:
- a target area acquirer configured to acquire a target area including the object from the image; and
- an information extractor configured to extract information associated with a feature of the object from the target area.

12. The image processing apparatus of claim 11, wherein the target area acquirer is configured to detect the object included in the image, and to acquire the target area by detecting the feature of the object from the object.

13. The image processing apparatus of claim 11, wherein the information comprises any one or any combination of two or more of a contour of the feature of the object, a relative location of the feature of the object on the target area, and an area of the feature of the object on the target area.

14. The image processing apparatus of claim 10, wherein the normalizer is configured to correct a size and an angle of the feature of the object with respect to the approximated target area.

15. The image processing apparatus of claim 10, wherein the object detector is configured to compare the evaluation score and a detection reference score, and to determine whether to perform a detection of the object based on a result of the comparing.

16. The image processing apparatus of claim 15, wherein the object detector is configured to suspend the detection of the object in response to the evaluation score being less than the detection reference score based on the comparison result, and to perform the detection of the object in response to the evaluation score being greater than or equal to the detection reference score based on the comparison result.

17. The image processing apparatus of claim 16, wherein the object detector is configured to determine whether to perform a detection of an object included in a subsequent frame based on an evaluation score of the object included in the subsequent frame, in response to the evaluation score being less than the detection reference score based on the comparison result.

18. The image processing apparatus of claim 10, wherein the object detector is configured to detect the object using an AdaBoost algorithm.

19. An image processing method implemented by a processor, comprising:
- receiving an image in a plurality of frames;
- acquiring a target image that includes an object from the image in a first frame of the plurality of frames by normalizing a target area including the object based on an information associated with a feature of the object;
- calculating an evaluation score by evaluating a quality of the target image in the first frame; and
- suspending a detection of the object from the target image in the first frame in response to the evaluation score being less than a detection reference score and performing the detection of the object in response to the evaluation score being greater than or equal to the detection reference score, wherein the acquiring of the target image comprises:
- performing an approximation of the target area by enlarging or reducing the target area;
- performing a scale normalization on the approximated target area based on the information; and
- acquiring the target image by performing an illumination normalization on the scaled normalized target area.

20. The method of claim 19, wherein subsequent frames of the plurality of frames are evaluated based on the evaluation score of the object included in the first frame.

* * * * *